United States Patent
Simpson

(10) Patent No.: US 10,392,988 B2
(45) Date of Patent: Aug. 27, 2019

(54) PRESSURE RELIEF SYSTEM FOR DIESEL EXHAUST FLUID FREEZE DAMAGE MITIGATION

(71) Applicant: GM GLOBAL TECHNOLOGY OPERATIONS LLC, Detroit, MI (US)

(72) Inventor: David Simpson, Ajax (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 147 days.

(21) Appl. No.: 15/639,404

(22) Filed: Jun. 30, 2017

(65) Prior Publication Data

US 2019/0003364 A1    Jan. 3, 2019

(51) Int. Cl.
*F01N 3/20*    (2006.01)

(52) U.S. Cl.
CPC .... *F01N 3/2066* (2013.01); *F01N 2610/1406* (2013.01); *F01N 2610/1433* (2013.01); *F01N 2610/1466* (2013.01); *F01N 2610/1486* (2013.01)

(58) Field of Classification Search
CPC ........... F01N 3/2066; F01N 2610/1406; F01N 2610/1433; F01N 2610/1466
See application file for complete search history.

(56) References Cited

U.S. PATENT DOCUMENTS

2010/0050606 A1* 3/2010 Fulks .................... F01N 3/2066
60/286

* cited by examiner

*Primary Examiner* — Brandon D Lee
(74) *Attorney, Agent, or Firm* — Cantor Colburn LLP

(57) ABSTRACT

A system for diesel exhaust fluid (DEF) pressure relief for a vehicle that includes a DEF pump assembly in an interior of a DEF storage tank is described. The system includes a DEF shear structure fixed to a top interior portion of the DEF storage tank. The DEF shear structure includes a plurality of expansion channels extending from the top interior portion of the DEF storage tank into stored DEF in the storage tank. When the DEF storage tank experiences a freeze event the plurality of expansion channels have smooth walls configured to guide a frozen DEF away from the DEF pump assembly.

18 Claims, 2 Drawing Sheets

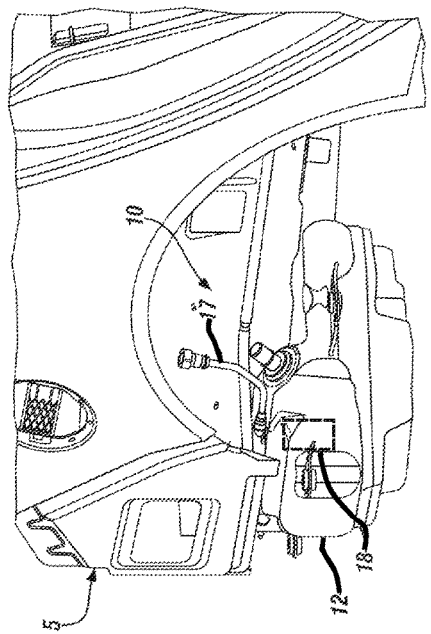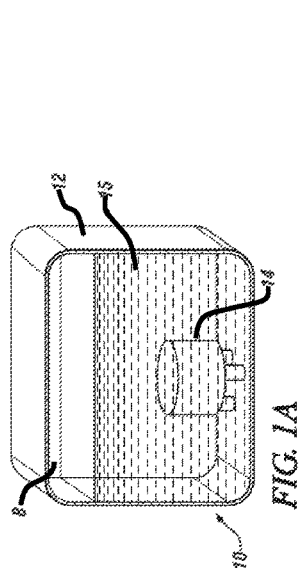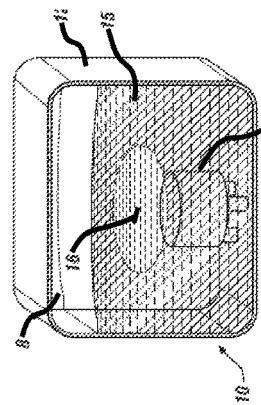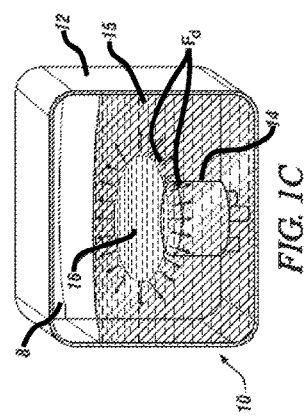

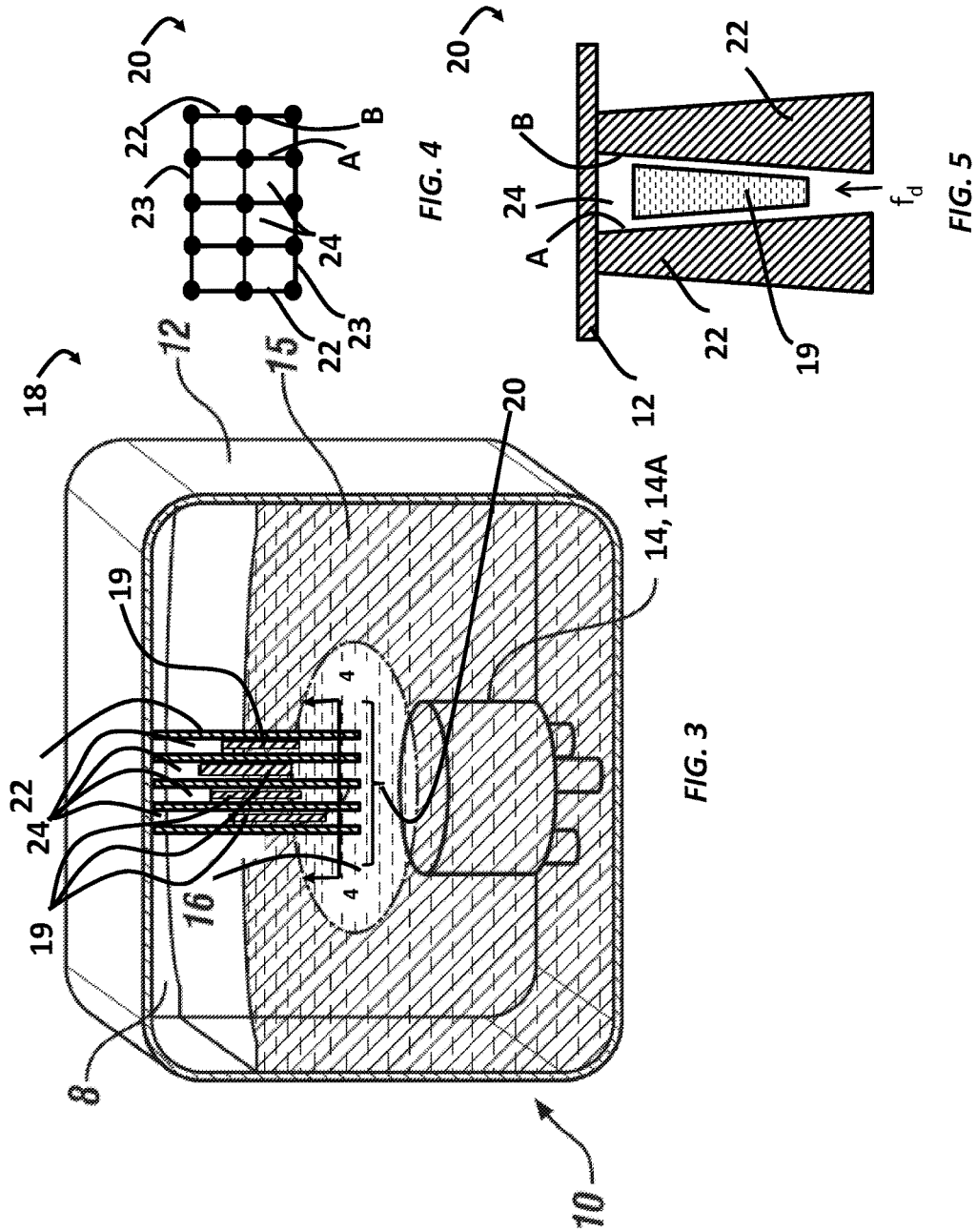

PRESSURE RELIEF SYSTEM FOR DIESEL EXHAUST FLUID FREEZE DAMAGE MITIGATION

INTRODUCTION

The subject disclosure relates to a storage vessel for diesel exhaust fluid, and more particularly, to a system for relieving pressure in the vessel upon freezing of the liquid.

Diesel engines are preferred for many heavy duty applications such as long-haul trucking, for instance, due to performance characteristics inherent in the Otto cycle upon which they are based. Unfortunately, such performance comes with the cost of an increase in certain regulated exhaust constituents. One class of exhaust constituents that must be controlled are oxides of Nitrogen (NOx). One way of doing so, in automotive applications, is through the use of a diesel exhaust after-treatment system such as a selective catalytic reduction (SCR) system. An SCR system employs the use of a SCR catalyst in conjunction with a metered amount of injected diesel exhaust fluid (DEF). A typical SCR system utilizes a catalyst coated substrate integrated into the exhaust system that works with injected DEF upstream of the catalyst and is "activated" by exhaust gas heat. The DEF mixes with the diesel exhaust gas and reacts with the catalyst coated substrate in a known manner to reduce certain Oxides of Nitrogen (NOx compounds).

Automotive applications that employ DEF systems for the reduction of NOx must carry a supply of DEF in a tank that is connected via a fluid delivery line to the diesel engine exhaust system. A challenge in the design of these systems is that DEF freezes below −11 degrees Celsius (−11° C.) which is well above the minimum operable temperature of the vehicle. The freezing behavior of DEF in the DEF tank may be driven in part by the thermal mass of the in-tank DEF pump assembly, resulting in the final fluid portion of the tank residing above or adjacent to the pump assembly. As the final fluid portion freezes, the DEF experiences an expansion rate of about 10% which results in the application of significant forces on the pump assembly. Damage may result.

It is desirable to provide a DEF system that avoids the damaging force that may result when DEF freezing occurs at low operating temperatures.

SUMMARY

In one exemplary embodiment, a system for diesel exhaust fluid (DEF) pressure relief for a vehicle includes a DEF pump assembly in an interior of a DEF storage tank. The system includes a DEF shear structure fixed to a top interior portion of the DEF storage tank. The DEF shear structure includes a plurality of expansion channels extending from the top portion of the DEF storage tank into stored DEF in the storage tank. The plurality of expansion channels have smooth walls configured to guide a frozen DEF away from the DEF pump assembly.

In another exemplary embodiment, a DEF pressure relief tank for a vehicle includes a DEF storage tank, and a DEF shear structure fixed to a top interior portion of the DEF storage tank. The DEF shear structure includes a plurality of expansion channels extending from the top interior portion of the DEF storage tank into stored DEF in the storage tank. The plurality of expansion channels have smooth walls configured to guide frozen DEF away from an inner portion of the DEF storage tank that is configured for installation of a DEF pump assembly.

In another exemplary embodiment, a vehicle includes a DEF pressure relief system. The DEF pressure relief system includes a DEF storage tank, a DEF pump assembly in an interior of the DEF storage tank, and a DEF shear structure fixed to a top interior portion of the DEF storage tank. The DEF shear structure includes a plurality of expansion channels extending from the top interior portion of the DEF storage tank toward an inner portion of the DEF storage tank configured for a DEF pump assembly. The plurality of expansion channels have smooth walls configured to guide frozen DEF away from the DEF pump assembly.

In another exemplary embodiment, the plurality of expansion channels are configured to relieve the DEF pressure on the pump assembly by guiding the frozen DEF away from the DEF pump assembly in the plurality of expansion channels. The Expansion channels guide the frozen DEF in response to DEF pressure near the DEF pump assembly.

In another exemplary embodiment, the expansion channels are configured to relieve the DEF pressure on the pump assembly when DEF pressure on the frozen DEF exceeds an ambient air pressure at an interior of the DEF storage tank.

In another exemplary embodiment, the DEF shear structure includes a plurality of shear members configured in a rectangular array. The plurality of expansion channels are formed by intersections of the plurality of shear members.

In another exemplary embodiment, the DEF shear structure and the DEF storage tank are separate bodies, and the DEF shear structure is permanently fixed to the top interior portion of the DEF storage tank.

In the exemplary embodiment where the DEF shear structure and the DEF storage tank are separate bodies, a distance between pairs of opposing interior walls in each of the expansion channels is greater near the top interior portion of the DEF storage tank than a distance between the pairs of opposing interior walls at an open end of the expansion channels near the DEF pump assembly.

In another exemplary embodiment, the DEF shear structure and the DEF storage tank are injection molded as a unitary body.

In the embodiment where the DEF shear structure and the DEF storage tank are a unitary body, a distance between pairs of opposing interior walls in each of the expansion channels is about equal near the top interior portion of the DEF storage tank to a distance between the pairs of opposing interior walls at an open end of the expansion channels near the DEF pump assembly.

In another exemplary embodiment, the DEF shear structure is high density polyethylene (HDPE).

The above features and advantages, and other features and advantages of the disclosure, are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 1A is a diagram of one step in an exemplary freezing sequence of diesel exhaust fluid (DEF) in a DEF tank;

FIG. 1B is a diagram of a second step in an exemplary freezing sequence of diesel exhaust fluid (DEF) in a DEF tank;

FIG. 1C is a diagram of a third step in an exemplary freezing sequence of diesel exhaust fluid (DEF) in a DEF tank;

FIG. 2 is a partial view of a vehicle with a diesel exhaust fluid (DEF) storage pressure relief system according to one embodiment;

FIG. 3 is a schematic view of a diesel exhaust fluid (DEF) storage pressure relief system according to one embodiment;

FIG. 4 is a section view of a diesel exhaust fluid (DEF) shear structure, taken along line 4-4 of FIG. 3, according to one embodiment; and FIG. 5 is a section view of two shear members of a separately-molded diesel exhaust fluid (DEF) shear structure according to one embodiment.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIGS. 1A-1C illustrate a DEF system 10, of the type that may be installed in a vehicle having a diesel-type internal combustion engine (not shown), experiencing a freezing sequence of diesel exhaust fluid (DEF) 15. DEF system 10 includes a DEF storage tank 12 having a pump assembly 14 disposed therein. As noted above, automotive applications that employ DEF systems for the reduction of NOx may carry a supply of DEF 15 in DEF storage tank 12. DEF 15 may be fluidly connected, via a supply system (not shown), to the exhaust system of the vehicle (not shown). A challenge of some DEF systems occurs below −11 degrees Celsius (−11° C.), where DEF 15 freezes. −11° C. is above the minimum operable temperature of the vehicle. DEF 15 in DEF storage tank 12 may freeze based on various factors. For example, the pump assembly 14 (as a thermal mass) may take longer to cool than surrounding DEF 15, and may therefore cause DEF, proximate to the pump assembly 14, to freeze last. As shown in FIG. 1B, DEF 15 tends to freeze from the exterior of DEF storage tank 12 to the interior of DEF storage tank 12. The freezing pattern may result in a final fluid portion 16 residing above or closely adjacent to the pump assembly 14. As depicted in FIG. 1C, as the final fluid portion 16 freezes, DEF 15 can experience an expansion rate of about 10%, which can result in the application of significant forces $F_d$ on pump assembly 14. It may be advantageous to provide a system configured to relieve fluid forces exerted on pump assembly 14 components.

FIG. 2 depicts a DEF vessel pressure relief system 18 (hereafter "system 18") that includes a DEF storage tank 12. Referring now to FIG. 2, in an exemplary embodiment, a vehicle 5 includes DEF vessel pressure relief system 18. System 18 includes a DEF storage tank 12 that is configured to contain DEF 15, for supply via a pressurized supply line 17 to the vehicle exhaust system.

System 18 is described in greater detail with respect to FIGS. 3 and 4. FIG. 3 is a schematic view of a diesel exhaust fluid (DEF) storage pressure relief system according to one embodiment. FIG. 4 is a section view 4-4 of DEF shear structure 20. Referring first to FIG. 3, system 18 is depicted, according to embodiments. System 18 includes a DEF storage tank 12, and a pump assembly 14. Pump assembly 14 is configured in an interior of DEF storage tank 12. System 18 can include one or more frozen DEF 19 formed between a plurality of DEF shear members 22. The cavities formed by DEF shear members 22 (hereafter referred to as "expansion channels 24") can include DEF in the channels that, when frozen, form frozen DEF 19 within expansion channels 24.

DEF storage tank 12 is configured for installation of a DEF pump assembly 14. In some embodiments, DEF storage tank 12 includes DEF pump assembly 14. In other embodiments, DEF storage tank 12 is merely configured for installation of DEF pump assembly 14. DEF pump assembly 14 can include a pump body 14A.

Because DEF 15 expands in unpredictable ways when the DEF freezes, it is advantageous to provide a structure to control the freezing process to be more predictable by directing how DEF 15 expands during freezing. One way of controlling the freezing process is through one or more shear structures 20. DEF shear structure 20 includes a plurality of shear members 22 configured to separate freezing DEF into smaller contained bodies that will readily shear as they expand during the freezing process. The interior intersections of shear members 22 form a plurality of expansion channels 24. Expansion channels 24 extend from the top interior portion of the DEF storage tank into DEF storage tank 12 to an area proximate to a top portion of pump assembly 14. Expansion channels 24 have open ends proximate to DEF pump assembly 14 such that when DEF 15 is stored in DEF storage tank 12, the open ends of expansion channels 24 reside in final fluid portion 16 proximate to DEF pump assembly 14. Although not shown, interior corners of expansion channels 24 may include fillets that provide a smooth surface from which frozen DEF 19 are guided.

DEF shear structure 20 is a structure made with a low surface energy material (e.g., high density polyethylene) such that the frozen DEF 15 in contact with interior surfaces of structure 20 (e.g., expansion channels 24) is broken into smaller parts 19 that can slide along the smooth interior walls of expansion channels 24 in DEF shear structure 20. Expansion channels 24 have smooth interior walls to guide the displaced smaller bodies of frozen DEF (described collectively as "frozen DEF 19") away from the DEF pump assembly 14. According to embodiments, as internal forces $f_d$ that would have pressed against pump assembly 14 are now allowed to displace the smaller frozen DEF pieces that have broken free from the walls of the expansion channels 24, those forces now can push up the expansion channels 24 to relieve pressure on the pump assembly 14.

According to embodiments, DEF shear structure 20 is either molded as part of, or plastic welded to, DEF storage tank 12. DEF shear structure 20 includes features with low surface energy to separate frozen DEF 19 that will readily shear, minimizing the potential pressure exerted on internal components.

Expansion channels 24 are configured to relieve the fluid pressure on DEF pump assembly 14 by guiding the frozen DEF 19 away from the DEF pump assembly 14. For example, the pressure from freezing DEF 15 in the DEF storage tank 12 will press against the frozen DEF and the pump assembly 14 at the same time. The frozen DEF 19 can break free of the side walls of DEF shear structure 20 (e.g., walls A and B shown in FIG. 4) due to the low surface energy of the DEF shear structure 20 material. The frozen DEF 19 can, after breaking loose due to fluid pressure, slide up the plurality of expansion channels 24 responsive to the DEF pressure near the DEF pump assembly 14.

In one embodiment, DEF shear structure 20 is attached to an interior portion of DEF storage tank 12 such that one end of DEF shear structure 20 can be immersed in DEF 15 near pump assembly 14. DEF shear structure 20 is in contact with a final fluid portion 16, which is the unfrozen portion of the DEF 15. As DEF 15 freezes, shear members 22 of DEF shear structure 20 separate the freezing fluid into multiple frozen DEF 19. The separation and controlled freezing aspects of shear members 22 minimize potential pressures exerted on internal components such as, for example, pump assembly 14. In some aspects, system 18 may relieve the DEF pressure $f_d$ on the DEF pump assembly 14 when the DEF pressure on frozen DEF 19 exceed an ambient air pressure at an interior of the DEF storage tank 12. An ambient air pressure may be, for example, between 95 kPa (13.8 psi) to 110 kPa (14.7 psi). When the ambient air pressure is less than the sum of the expansion pressure of the freezing DEF and the friction forces between frozen DEF 19 and expansion channels 24, then frozen DEF 19 will break free and be guided along expansion channels 24 away from DEF pump assembly 14.

Shear members 22 may take a variety of shapes. For example, the embodiments depicted with respect to FIGS. 3 and 4 show shear members 22 as rectangular arrays of intersecting ribs that form square-shaped pockets or expansion channels. Although depicted as a rectangular array forming square cavities (expansion channels 24), it is appreciated that DEF shear structure 20 may take various shapes, and have additional features (e.g., internal fillets at the corners of intersecting members) not shown.

The DEF storage relief system 18 of FIG. 3 depicts configurations of shear members 22 where shear members 22 are either a unitary body with DEF storage tank 12, or they have been plastic welded to the top half portion of DEF storage tank 12.

FIG. 4 depicts a section view 4-4 of DEF shear structure 20, according to one embodiment. Referring now to FIG. 4, DEF shear structure 20 include a plurality of shear members 22 forming a plurality of pockets (e.g., expansion channel 24). Shear members 22 may be configured in various ways to increase the ability for the frozen DEF portions (frozen DEF 19) to break free from the walls of expansion channels 24 and be pushed up by fluid forces acting on final fluid portion 16.

Frozen DEF 19 are frozen portions of DEF 15. System 18 is configured to minimize expansion pressure exerted on pump assembly 14 by separating DEF 15 into smaller portions that more readily shear due to surface contact with DEF shear structure 20. For example, as DEF 15 freezes, DEF shear structure 20 shears DEF 15 into frozen DEF 19. Internal forces $f_d$ (FIG. 1C) push frozen DEF 19, forcing them slide along the walls of expansion channels 24 during the freezing process. By expanding toward air space 8 (and more particularly, by sliding along the interior surfaces of expansion channels 24 of DEF shear structure 20 toward air space 8) system 18 relieves the force applied to pump assembly 14 by the final fluid portion 16 as frozen DEF 19 are displaced by the exerted pressure.

According to embodiments, DEF shear structure 20 is molded from a low-energy shear material such as, for example, high density polyethylene (HDPE). Other low-energy shear materials are contemplated. In some aspects, DEF shear structure 20 can be molded as a unitary body with DEF storage tank 12 (or more particularly, with an upper half of DEF storage tank 12, which is then plastic welded to a molded lower half portion of the tank). As shown in FIG. 4, in one embodiment, the expansion channels 24 (i.e., the spaces between (interior to) shear members 22) allow DEF 15 to slide away from pump assembly 14. Accordingly, the interior walls of shear members 22 are molded as a unified structure integrated with DEF storage tank 12, where the interior cavities (e.g., the walls A and B shown in FIG. 4) have zero slope with respect to each other. Stated another way, the interior walls of DEF shear structure 20 (i.e., the spaces formed by shear members 22 and 23) have the same dimension (the distance between walls A and B, for example) throughout the entire length of DEF shear structure 20. Expansion channels 24 must have zero or about zero slope when the DEF storage tank 12 and DEF shear structure 20 are molded as a unitary body because adding natural slope to expansion channels 24 of an integrated DEF shear structure (without opening a cavity in a top surface of DEF storage tank 12 to accommodate tooling) would result in a negative slope that would restrict movement of the frozen portions (frozen DEF 19) in the field.

Instead of forming shear structure 20 as a unified body with DEF storage tank 12, DEF shear structure 20 can be manufactured as a separate body from DEF storage tank 12, and plastic-welded to an interior surface of the storage tank in a separate manufacturing process. Alternatively the DEF shear structure 20 can be passed through an opening in the top of the tank and plastic-welded to the exterior top surface of the tank.

FIG. 5 depicts a section view of two shear members 22 of a separately-molded DEF shear structure 20, according to another embodiment. One advantage of the embodiment depicted in FIG. 5 is a simplification of tooling with respect to DEF storage tank 12 (although an additional mold is needed for DEF shear structure 20) and the utilization of the DEF shear structure 20 on a non-injection molded tank (i.e., blow molded tank). Tooling for DEF storage tank 12 is simplified because the core-side mold surface that forms the interior surfaces of expansion channels 24 (e.g., walls A and B, and the adjacent walls now shown in FIG. 5 for clarity) can now include slope that allows ease of ejection of DEF shear structure 20 from the core side of the tool.

Additionally, by molding interior walls A and B to have an interior slope as depicted in FIG. 5, the end of DEF shear structure 20 having the widest dimension between walls A and B can now be plastic welded to an interior top surface of DEF storage tank 12, leaving the narrowest dimension end (respective to the distance between walls A and B in FIG. 5) projecting into DEF 15 with open expansion channel ends nearest to pump assembly. In one embodiment, when configured as shown in FIG. 5, the same circumstances allowing ease of part ejection from the tool during manufacturing also provides a relief that eases displacement of frozen DEF 19 as force $f_d$ presses against the bottom surface of frozen DEF 19.

In FIG. 5, the thickness and slope angle of shear members 22 are exaggerated for explanatory purposes only, and are not meant to limit to a particular shape or scale. Although only two shear members 22 are depicted, it is appreciated that DEF shear structure 20 can include any number of shear members 22. Moreover, although DEF shear structure 20 is depicted having a particular shape, or having two intersecting arrays of shear members 22 and shear members 23, respectively, it is appreciated that DEF shear structure 20 may take many other shapes, and have more or less shear members than those shown in corresponding figures.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for diesel exhaust fluid (DEF) pressure relief for a vehicle comprising:
    a DEF pump assembly in an interior of a DEF storage tank; and
    a DEF shear structure fixed to a top portion of the DEF storage tank, wherein the DEF shear structure comprises:
    a plurality of expansion channels extending from the top portion of the DEF storage tank toward the DEF pump assembly, the plurality of expansion channels having smooth walls configured to guide displaced frozen DEF away from the DEF pump assembly; and
    wherein a distance between pairs of opposing interior walls in each of the expansion channels is greater near the top portion of the DEF storage tank than a distance between the pairs of opposing interior walls at an open end of the expansion channels near the DEF pump assembly.

2. The system of claim 1, wherein the plurality of expansion channels are configured to relieve the DEF pressure on the DEF pump assembly by guiding the frozen DEF away from the DEF pump assembly in the plurality of expansion channels responsive to DEF pressure near the DEF pump assembly.

3. The system of claim 2, wherein the expansion channels are configured to relieve the DEF pressure on the DEF pump assembly when DEF pressure on the frozen DEF exceeds an ambient air pressure at an interior of the DEF storage tank.

4. The system of claim 1, wherein the DEF shear structure comprises a plurality of shear members configured in a rectangular array; and
    the plurality of expansion channels are formed by intersections of the plurality of shear members.

5. The system of claim 1, wherein the DEF shear structure and the DEF storage tank are separate bodies, and the DEF shear structure is permanently fixed to the top portion or through an opening in the top portion and permanently fixed to an exterior portion of the DEF storage tank.

6. The system of claim 1, wherein the DEF shear structure and the DEF storage tank are injection molded as a unitary body.

7. The system of claim 1, wherein the DEF shear structure is high density polyethylene (HDPE).

8. A diesel exhaust fluid (DEF) pressure relief tank for a vehicle comprising:
    a DEF storage tank; and
    a DEF shear structure fixed to a top portion of the DEF storage tank, wherein the DEF shear structure comprises:
    a plurality of expansion channels extending from the top portion of the DEF storage tank toward an inner portion of the DEF storage tank configured for a DEF pump assembly, the plurality of expansion channels having smooth walls configured to guide frozen DEF away from the inner portion of the DEF storage tank and up towards the top portion;
    wherein the DEF shear structure comprises a plurality of shear members configured in a rectangular array; and
    the plurality of expansion channels are formed by intersections of the plurality of shear members.

9. The DEF pressure relief tank of claim 8, wherein the plurality of expansion channels are configured to relieve the DEF pressure on the DEF pump assembly by guiding the frozen DEF away from the inner portion of the DEF storage tank in the plurality of expansion channels responsive to DEF pressure near the DEF pump assembly.

10. The DEF pressure relief tank of claim 9, wherein the expansion channels are configured to relieve the DEF pressure near the inner portion of the DEF storage tank when DEF pressure on the frozen DEF exceeds an ambient air pressure at an interior of the DEF storage tank.

11. The DEF pressure relief tank of claim 8, wherein the DEF shear structure and the DEF storage tank are separate bodies, and the DEF shear structure is permanently fixed to the top portion of the DEF storage tank.

12. The DEF pressure relief tank of claim 11, wherein a distance between pairs of opposing interior walls in each of the expansion channels is greater near the top portion of the DEF storage tank than a distance between the pairs of opposing interior walls at an open end of the expansion channels near the inner portion of the DEF storage tank.

13. The DEF pressure relief tank of claim 8, wherein the DEF shear structure and the DEF storage tank are injection molded as a unitary body.

14. The DEF pressure relief tank of claim 13, wherein a distance between pairs of opposing interior walls in each of the expansion channels is about equal near the top portion of the DEF storage tank to a distance between the pairs of opposing interior walls at an open end of the expansion channels near the top portion of the DEF storage tank.

15. The DEF pressure relief tank of claim 8, wherein the DEF shear structure is high density polyethylene (HDPE).

16. A vehicle configured with a diesel exhaust fluid (DEF) pressure relief system comprising:
    A DEF storage tank;
    a DEF pump assembly in an interior of the DEF storage tank; and
    a DEF shear structure fixed to a top portion of the DEF storage tank, wherein the DEF shear structure comprises:
    a plurality of expansion channels extending from the top portion of the DEF storage tank toward the DEF pump assembly; and
    wherein a distance between pairs of opposing interior walls in each of the expansion channels is greater near the top portion of the DEF storage tank than a distance between the pairs of opposing interior walls at an open end of the expansion channels near the DEF pump assembly.

17. The vehicle of claim 16, wherein the plurality of expansion channels are configured to relieve the DEF pressure on the DEF pump assembly by guiding the frozen DEF away from the DEF pump assembly in the plurality of expansion channels responsive to DEF pressure near the DEF pump assembly.

18. The vehicle of claim 16 wherein the DEF shear structure comprises a plurality of shear members configured in a rectangular array; and
    the plurality of expansion channels are formed by intersections of the plurality of shear members.

* * * * *